(12) United States Patent
Wu et al.

(10) Patent No.: US 8,437,363 B2
(45) Date of Patent: May 7, 2013

(54) METHODS AND APPARATUS FOR RESOLVING TRANSMISSION PRIORITY IN A WIRELESS PEER-TO-PEER NETWORK

(75) Inventors: Xinzhou Wu, Monmouth Junction, NJ (US); Nilesh Khude, Bridgewater, NJ (US); Sundar Subramanian, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 12/966,156

(22) Filed: Dec. 13, 2010

(65) Prior Publication Data

US 2012/0147857 A1  Jun. 14, 2012

(51) Int. Cl.
*H04L 12/43* (2006.01)

(52) U.S. Cl.
USPC ..................... 370/461; 370/395.42

(58) Field of Classification Search .......... 370/461, 370/349, 462, 442, 444, 443, 445, 447, 450, 370/454, 456, 458, 321, 329, 337, 341, 347, 370/348
See application file for complete search history.

(56) References Cited

U.S. PATENT DOCUMENTS

| | | | |
|---|---|---|---|
| 5,613,211 A | 3/1997 | Matsuno | |
| 6,169,744 B1 | 1/2001 | Grabelsky et al. | |
| 7,075,890 B2 | 7/2006 | Ozer et al. | |
| 7,352,770 B1 * | 4/2008 | Yonge et al. | 370/445 |
| 7,978,725 B2 * | 7/2011 | Gong et al. | 370/445 |
| 2007/0091824 A1 | 4/2007 | Budampati et al. | |
| 2009/0016231 A1 | 1/2009 | Li et al. | |
| 2009/0109850 A1 | 4/2009 | Li et al. | |
| 2012/0147745 A1 * | 6/2012 | Wang et al. | 370/235 |

FOREIGN PATENT DOCUMENTS

| | | |
|---|---|---|
| EP | 1855422 A1 | 11/2007 |

OTHER PUBLICATIONS

International Search Report and Written Opinion—PCT/US2011/063999—ISA/EPO—Feb. 27, 2012.
Marina M. K., et al.,"RBRP : a robust broadcast reservation protocol for mobile ad hoe networks", ICC 2001, 2001 IEEE International Conference on Communications, Conference Record, Helsinky, Finland, June 11-14, 2001; [IEEE International Conference on Communications], New York, NY : IEEE, US, vol. 3, Jun. 11, 2001, pp. 878-885, XP010553127, DOI: 10.1109/ICC.2001.937364 ISBN: 978-0-7803-7097-5 abstract paragraphs [00I.], [II.C].
Zhao M. et al., "Contention-Based Prioritized Opportunistic Medium Access Control in Wireless LANs", IEEE International Conference on Communications Proceedings, Istanbul, Turkey, Jun. 11-15, 2006, v. 8, p. 3820-3825.

* cited by examiner

*Primary Examiner* — Brenda H Pham
(74) *Attorney, Agent, or Firm* — James K. O'Hare

(57) ABSTRACT

Methods and apparatus for initiating a traffic transmission between a first device and a second device are disclosed. One method includes determining whether the first device has a receive priority or a transmit priority over the second device during a first data frame, determining whether the first device has data to transmit to the second device during the first data frame, transmitting, from the first device, a receive priority control signal during a receive priority control slot (Rxp) corresponding to the first data frame if the first device has the receive priority and no data to transmit, and transmitting, from the first device, a transmit priority control signal during a transmit priority control slot (Txp) corresponding to the first data frame if the first device has the transmit priority and data to transmit.

44 Claims, 10 Drawing Sheets

METHODS AND APPARATUS FOR RESOLVING TRANSMISSION PRIORITY IN A WIRELESS PEER-TO-PEER NETWORK

BACKGROUND

1. Field

The invention relates to wireless communications. More particularly, the invention relates to methods and apparatus for resolving transmission priority in a wireless peer-to-peer network.

2. Background

Wireless communications continues to grow in demand and has become an integral part of both personal and business communications. Wireless communications allow users to transmit and receive data from most anywhere using wireless networks and wireless devices such as laptops, cellular devices, iPhones®, BlackBerrys®, etc.

WiFi describes the wireless networks that adhere to the specifications developed by the Institute of Electrical and Electronic Engineers (IEEE) for wireless local area networks (LAN). WiFi devices are certified to be interoperable with other certified WiFi devices using the 802.11 standard of the IEEE. These WiFi devices allow over-the-air interfaces in order to create a wireless network for facilitating data transfer.

Generally, wireless networks are established through mobile devices communicating with one or more base stations, access points or access routers. A base station is a radio receiver/transmitter that serves as a hub for wireless networks. A base station can act as a relay for devices that are connected to it. An access router may be configured as an access point that covers a geographic range or cell and, as the mobile device is operated, it may move in and out of these geographic cells.

Some wireless networks can be constructed utilizing solely peer-to-peer communications without utilizing base stations, access points, or access routers. Such wireless networks are sometimes referred to as ad hoc networks. Communications in such networks may, in some cases, be limited to exchanges between mobile devices that are within direct wireless transmission range of each other, while in other cases multi-hop forwarding between non-adjacent mobile devices may be supported. Various techniques may be used to maintain connectivity and/or forward information as the topology of the wireless network changes (e.g., as mobile devices join the network, leave the network, or move within the network). Some networks can also be constructed utilizing a combination of peer-to-peer communications as well as communications with base stations, access points, or access routers.

In a time slotted ad-hoc wireless network with a designated phase for medium access contention (e.g., the connection scheduling phase in FlashLinQ), links contend simultaneously for a channel based on a notion of link priority. The notion of priority within a link needs to be resolved to resolve which of the two nodes within a link has the priority to transmit ("transmission priority"). In many cases, the nodes are half-duplex (i.e., cannot transmit and receive at the same time). Thus, a signaling protocol to determine the transmitter and the receiver of data between the two ends of the link is needed.

In FlashLinQ, as an example, a Txp stage within connection scheduling was designed so that a node with a transmission priority shows its intention to transmit during a transmit priority (Txp) so that the other node sharing the same link can determine whether or not it can contend as a transmitter in the current slot. A feature of the current protocol is that the Txp always appears together with an initiator request (Tx). This is simply due to the fact that after a Txp is sent, it is always followed by a Tx. As a consequence, some information can be sent over the combination of the signals in Tx_P and Tx. For example, the information can be conveyed by the phase difference between the Tx_P and Tx signals. One example of such information is the quality of service (QoS) information of the current transmission request. Since only the transmitters send out this information, this causes an asymmetry between the transmitter side and the receiver side (i.e., there is no similar mechanism to feedback this information from the receivers to the transmitters).

Therefore, it has been recognized by those skilled in the art that a need exists for methods and apparatus for resolving transmission priority in wireless peer-to-peer networks where there is symmetry between the transmitter side and the receiver side.

SUMMARY

The methods and apparatus are used to resolve the contention of transmission priority between two nodes sharing the same link in an ad hoc wireless network.

In various embodiments, methods and apparatus for initiating a traffic transmission between a first device and a second device are disclosed. One method includes determining whether the first device has a receive priority or a transmit priority over the second device during a first data frame, determining whether the first device has data to transmit to the second device during the first data frame, transmitting, from the first device, a receive priority control signal during a receive priority control slot (Rxp) corresponding to the first data frame if the first device has the receive priority and no data to transmit, and transmitting, from the first device, a transmit priority control signal during a transmit priority control slot (Txp) corresponding to the first data frame if the first device has the transmit priority and data to transmit.

The method may also include transmitting, from the first device, a traffic request signal during a traffic request control slot (Tx) if the first device has data to transmit and has permission from the second device to transmit or if the first device has the transmit priority and data to transmit, and transmitting, from the first device, a traffic request response signal to the second device during a traffic request response control slot (Rx) if the traffic request signal from the second device is present.

In one embodiment, the method includes transmitting, from the second device, the signaling of the receive priority control slot (Rxp) corresponding to a second data frame during the first data frame if the second device has the receive priority for the second data frame and no data to transmit for the second data frame, and/or transmitting, from the first device, the signaling of a traffic request response control slot (Rx) for the first data frame and the receive priority control slot (Rxp) for the second data frame if the first device has received a traffic request signal during a traffic request control slot (Tx) for the first data frame and has no data to transmit for the second data frame.

In one embodiment, the method includes transmitting information from the first device to the second device using a combination of the transmit priority control slot (Txp) and the traffic request control slot (Tx). The information may be transmitted using a phase difference between the transmit priority control slot (Txp) and the traffic request control slot (Tx). The information may be quality of service (QoS) information.

In one embodiment, the method includes transmitting information from the first device to the second device using a combination of the receive priority control slot (Rxp) and the traffic request response control slot (Rx). The information may be transmitted using a phase difference between the receive priority control slot (Rxp) and the traffic request response control slot (Rx). The information may be quality of service (QoS) information.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

Methods and apparatus that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
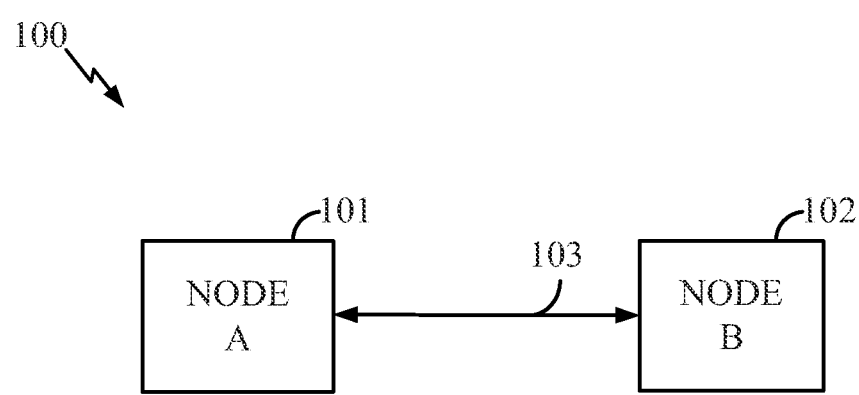
FIG. 1 is a simplified block diagram of a network having a plurality of nodes where each node can resolve the contention of transmission priority between two nodes sharing the same link in accordance with various embodiments.

FIG. 1 is a simplified block diagram of a network 100 having a plurality of nodes 101 and 102 where each node can resolve the contention of transmission priority between the two nodes 101 and 102 sharing the same link 103 in accordance with various embodiments. The network 100 is configured to resolve transmission priority between two nodes 101 and 102. In various embodiments, the network 100 can include one or more networks such as a WiFi network, an unlicensed network (i.e., a network operating in the unlicensed spectrum), a licensed network (i.e., a network operating in the licensed spectrum) and/or a carrier sense multiple access with collision avoidance (CSMA/CA) network, and each of the plurality of nodes 101 and 102 can be a WiFi device or node, a mobile device, a peer or a wireless communications device configured to operate in the licensed spectrum and/or the unlicensed spectrum, a user, or a white-space device (WSD) configured to operate in the licensed spectrum and/or the unlicensed spectrum. A WSD can be a mobile device, a laptop computer or other portable device operating in open or unused frequencies. For illustrative purposes, the disclosure will discuss WiFi networks; however, other types of licensed and unlicensed networks are within the scope of the invention. Furthermore, even though two nodes 101 and 102 are shown in FIG. 1, the network 100 can include one or more nodes. For illustrative purposes, nodes 101 and 102 will also be referred to as node A and node B, respectively.

Figure 2:
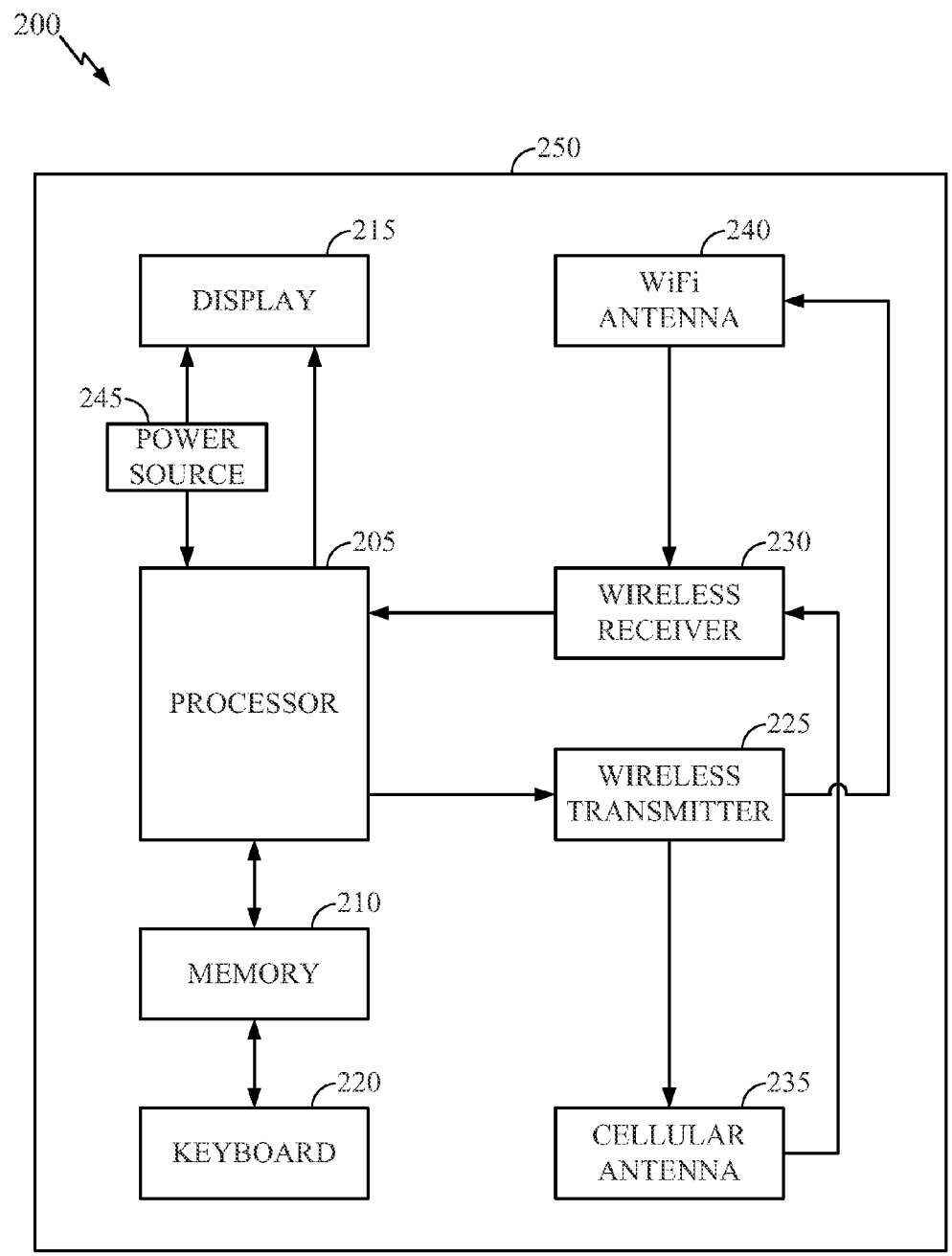
FIG. 2 is a block diagram of an exemplary node which can be used to resolve the contention of transmission priority between two nodes sharing the same link in accordance with various embodiments.

FIG. 2 is a block diagram of an exemplary node which can be used to resolve the contention of transmission priority between two nodes sharing the same link in accordance with various embodiments. For illustrative purposes, the term "node" or "peer" will refer to a wireless communications device 200. The wireless communications device 200 is configured to communicate in the licensed spectrum and/or the unlicensed spectrum. The wireless communications device 200 includes a processor 205, a memory 210, a display 215, a keyboard 220, a wireless transmitter 225, a wireless receiver 230, a first antenna 235, a second antenna 240, and a power source 245 (e.g., a battery). The chips, components or modules may be attached or formed on a printed circuit board 250. The printed circuit board 250 can refer to any dielectric substrate, ceramic substrate, or other circuit carrying structure for carrying signal circuits and electronic components within the wireless communications device 200.

The processor 205 may be implemented using hardware, software, firmware, middleware, microcode, or any combination thereof. The processor 205 may be an Advanced RISC Machine (ARM), a controller, a digital signal processor (DSP), a microprocessor, an encoder, a decoder, circuitry, a processor chip, or any other device capable of processing data, and combinations thereof. The term "circuitry" may include processor circuitry, memory circuitry, RF transceiver circuitry, power circuitry, video circuitry, audio circuitry, keyboard circuitry, and display circuitry.

The memory 210 may include or store various routines and data. The term "memory" and "machine readable medium" include, but are not limited to, random access memory (RAM), flash memory, read-only memory (ROM), EPROM, EEPROM, registers, hard disk, removable disk, CD-ROM, DVD, wireless channels, and various other mediums capable of storing, containing or carrying instruction(s) and/or data. The machine readable instructions may be stored in the memory 210 and may be executed by the processor 205 to cause the processor 205 to perform various functions as described in this disclosure. The display 215 may be a LCD, LED or plasma display screen and the keyboard 220 may be a standard keyboard (e.g., a QWERTY layout) having letters and numbers.

The wireless transmitter 225 is coupled to the processor 205 and is used to encode and format the data for transmission via the first antenna 235 and/or the second antenna 240. The wireless transmitter 225 includes chips, circuitry and/or software that are used to transmit data and/or signals that are received from the processor 205 and prior to being sent to the first antenna 235 and/or the second antenna 240 for transmission over a channel. The wireless transmitter 225 may use information (e.g., an ID) received from other channels or nodes via the first antenna 235, the second antenna 240, and/or the processor 205 to create new data and/or signals for transmission to other nodes.

The wireless receiver 230 is coupled to the processor 205 and is used to decode and parse the data after being received from the first antenna 235 and/or the second antenna 240. The wireless receiver 230 includes chips, circuitry and/or software that are used to receive information (e.g., an ID) from other channels or nodes via the first antenna 235 and/or the second antenna 240. The information is sent to the processor 205 for decoding and processing of the data and/or signals that are to be transmitted to another node via the first antenna 235 and/or the second antenna 240.

The first antenna 235 may be positioned at a lower right portion of the wireless communications device 200 and the second antenna 240 may be positioned at an upper right portion of the wireless communications device 200. The first antenna 235 may be a cellular antenna, a GSM antenna, a CDMA antenna, a WCDMA antenna, a 3G antenna, a 4G antenna, or any other antenna capable of operating using the licensed spectrum. The second antenna 240 may be a WiFi antenna, a GPS antenna, or any other antenna capable of operating using the unlicensed spectrum. The power source 245 supplies power to the components or modules shown in FIG. 2. For illustrative purposes, each node A and B shown in FIG. 1 can be a wireless communications device 200 as shown in FIG. 2.

Figure 3:
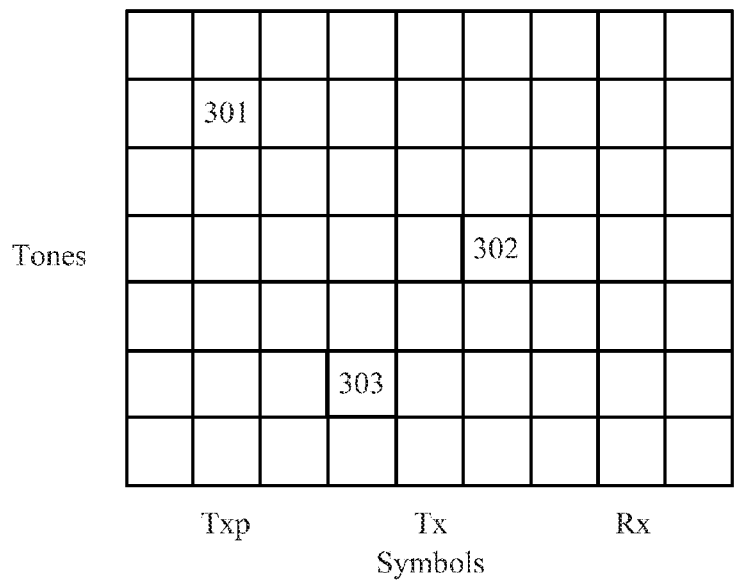
FIG. 3 is a link scheduling block having a plurality of resource units in accordance with various embodiments.

FIG. 3 is a link scheduling block 300 having a plurality of resource units 301-303 in accordance with various embodiments. Each resource unit is described by a pair of indices: one being time (i.e., symbol); and one being frequency (i.e., tone). That is, one or more symbols and one or more tones are grouped together in a logical structure called a resource unit. The resource 301 corresponds to some link and is a local ID used by one or more links. Hence, each link 103 is related to a local ID. The local ID maps to a symbol and a tone that can vary with time. Links that are close to another will not use the same resource.

Node A may be transmitting using the resource 301 if node A has data. In that resource, node A of the link can transmit data to node B of the link. As an example, if node A has transmit priority, then node A will signal to the other end of the link whether node A has data to transmit and if so, node A will be transmitting in the Txp resource for that link. The links are assigned a resource with an associated priority which is used to resolve the contention between the links. The resource can be a symbol-tone in an OFDM signal.

Each link that desires to participate in data transmission retrieves a resource unit (e.g., 301) from its memory 210. For illustrative purpose, the resource units are identified as 301, 302, 303, and so on. Each resource unit retrieved by a link can be referred to as the link's local ID. Multiple links can retrieve the same resource unit; therefore, the link's local ID is generally not unique to one particular link.

Figure 4:
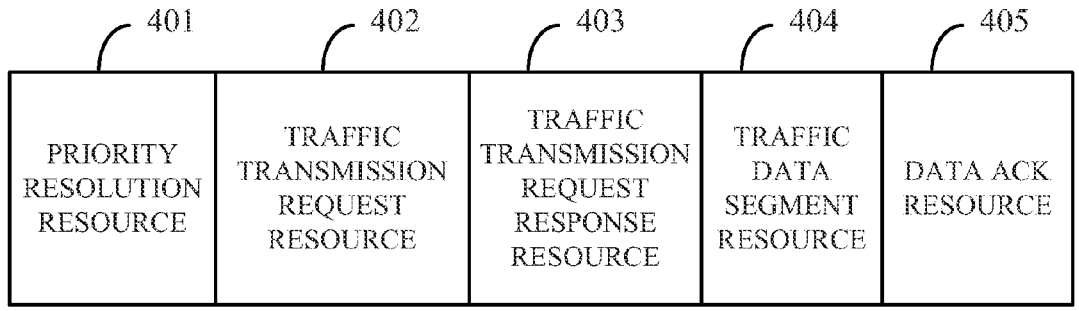
FIG. 4 is a block diagram illustrating an exemplary recurring peer-to-peer traffic slot used in accordance with various embodiments.

FIG. 4 is a block diagram illustrating an exemplary recurring peer-to-peer traffic slot 400 used in accordance with various embodiments. The traffic slot 400 includes a priority resolution resource 401 (e.g., Txp or Rxp), a traffic transmission request resource 402, a traffic transmission request response resource 403, a traffic data segment resource 404 and a data acknowledgment resource 405. Connection identifiers may be utilized during the traffic interval. Each connection identifier may be associated with a portion of the traffic transmission request resource 402, e.g., an OFDM tone-symbol, to be used for signaling a request to transmit data using the traffic data segment resource 404. Each connection identifier may also be associated with a portion of the traffic transmission request response resource 403, e.g., an OFDM tone-symbol, to be used for signaling an RX echo signal, which is a positive response to a traffic transmission request. The traffic data segment resource 404 may be used to carry peer-to-peer user data traffic signals for a connection, if the transmission request is granted and provided the transmitting device decided not to yield the resource. The data acknowledgement resource 405 may be used to carry a traffic data acknowledgment signal in response to traffic data communicated using traffic data segment resource 404.

Figure 5:
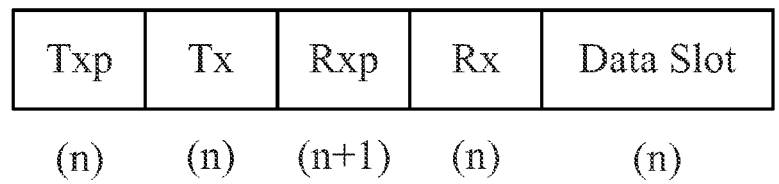
FIGS. 5-7 show exemplary time slots for transmitting and receiving by the nodes in accordance with various embodiments.
Figure 6:
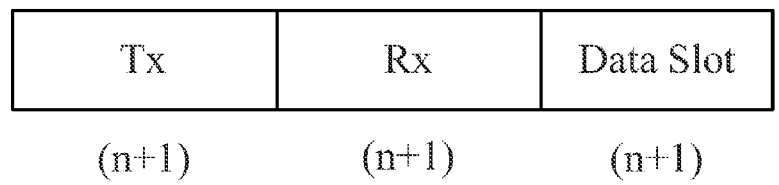
Figure 7:
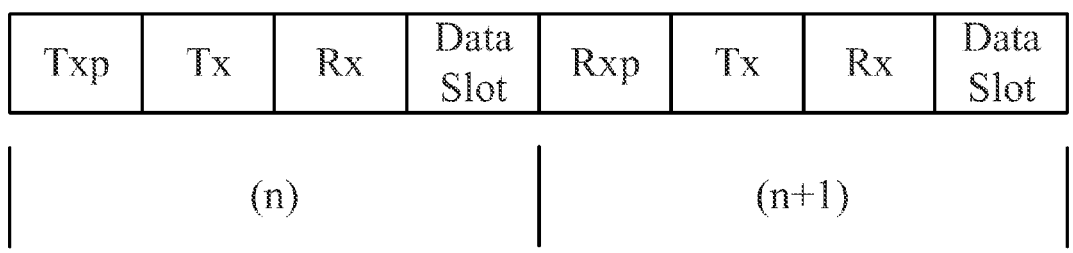
Figure 8:
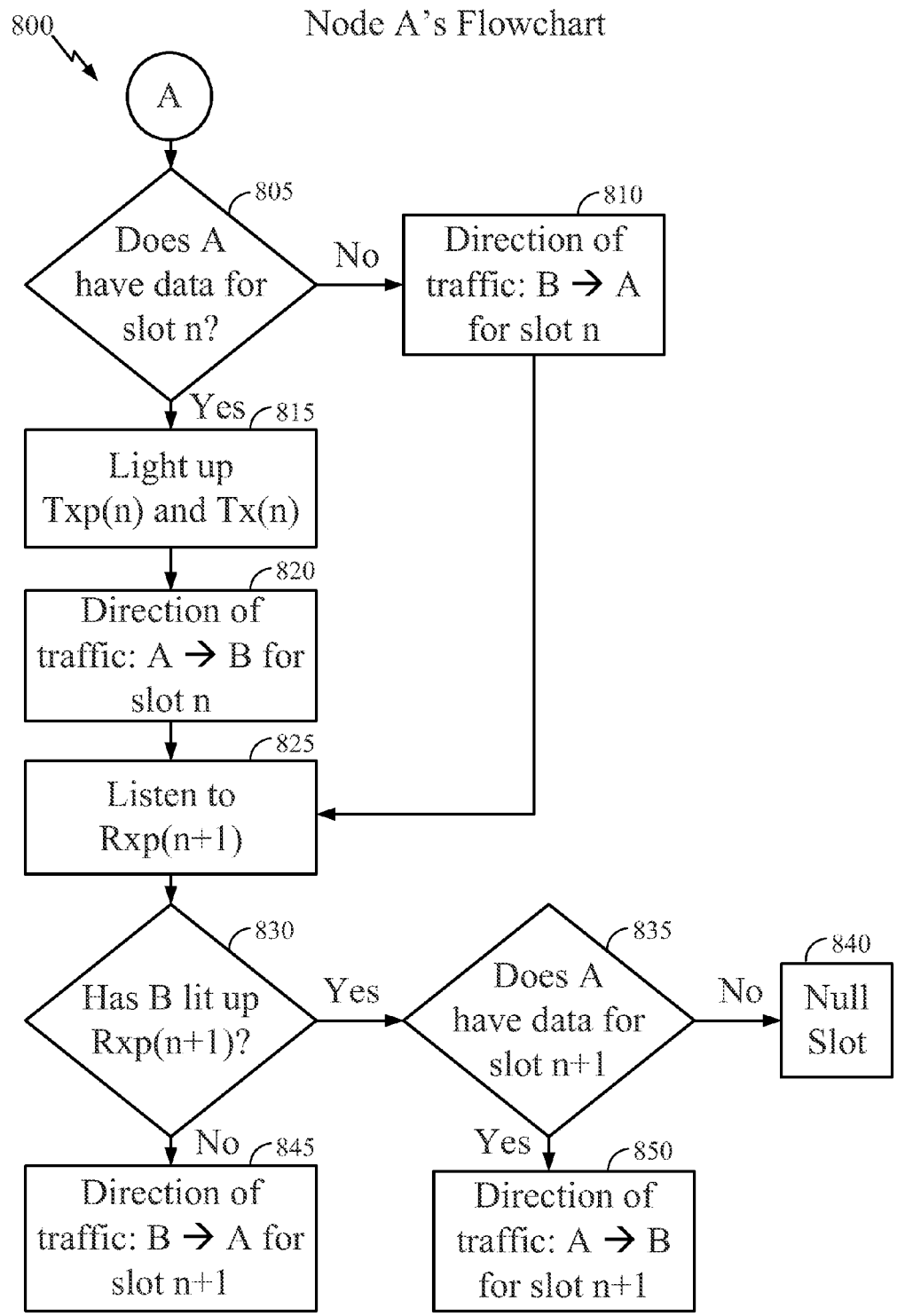
FIG. 8 is a flow diagram illustrating a method of resolving transmission priority from the perspective of node A in accordance with various embodiments.
Figure 9:
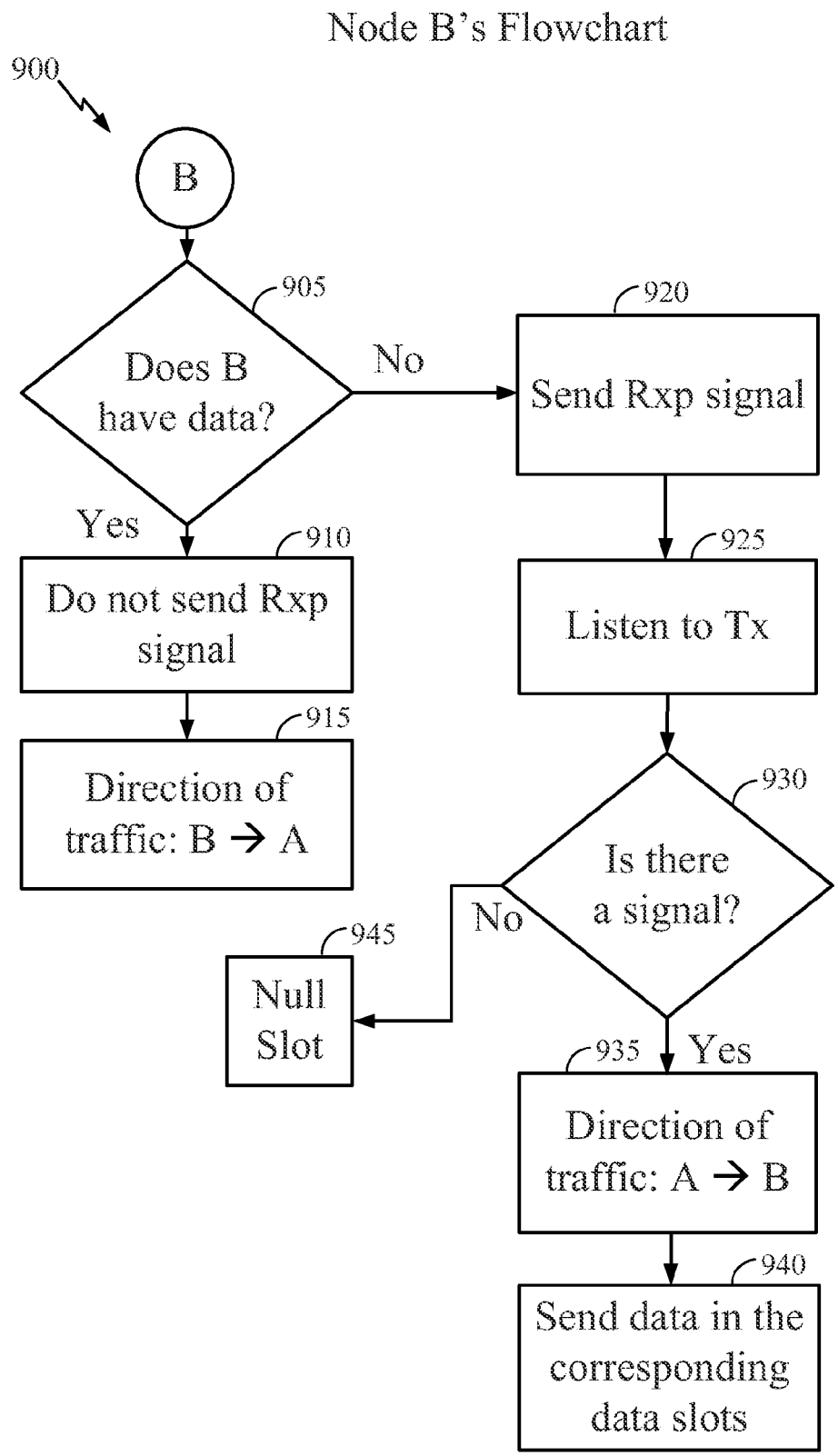
FIG. 9 is a flow diagram illustrating a method of resolving transmission priority from the perspective of node B in accordance with various embodiments.
Figure 10A:
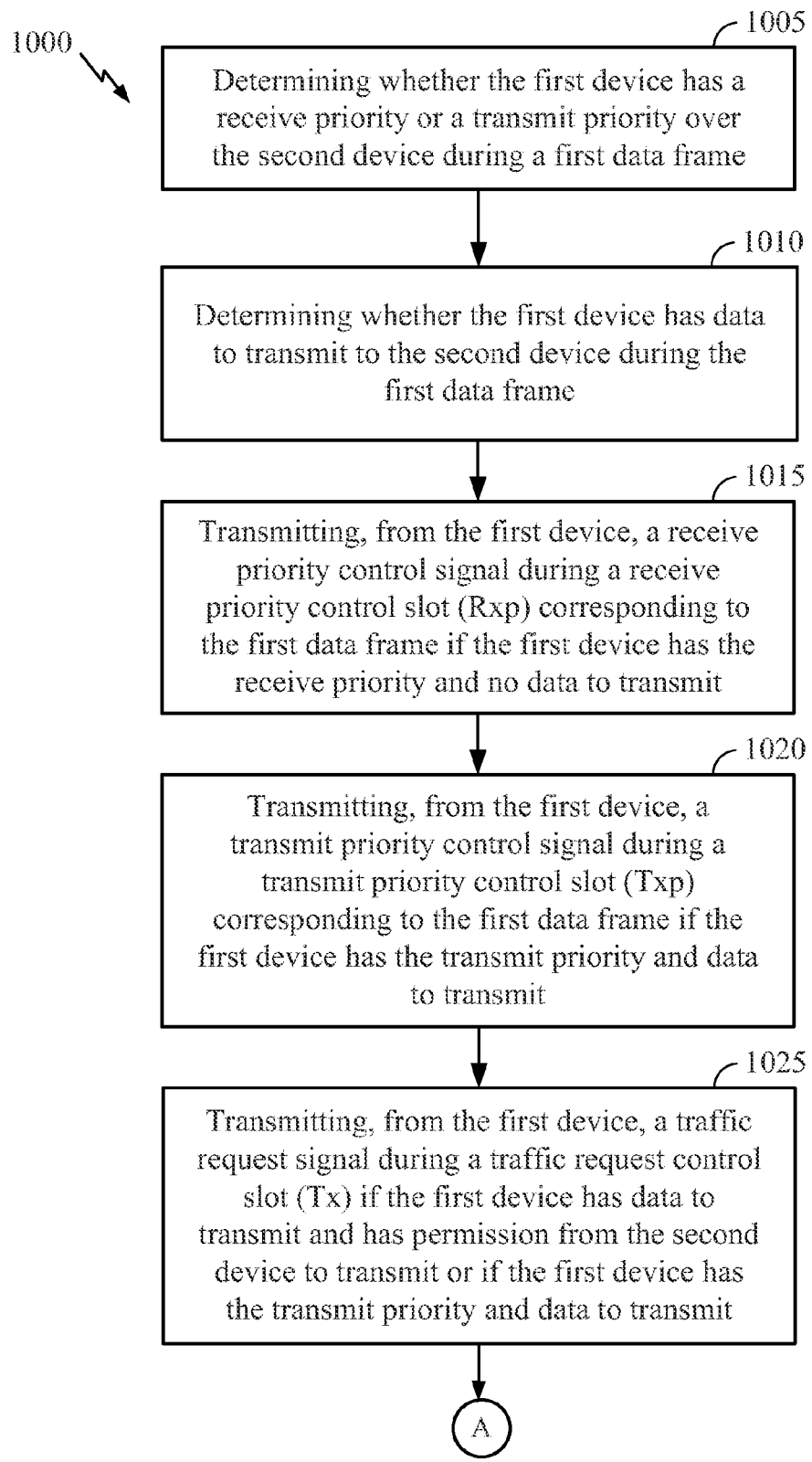
FIGS. 10A and 10B are flow diagrams illustrating a method of initiating a traffic transmission between a first device and a second device in accordance with various embodiments.
Figure 10B:
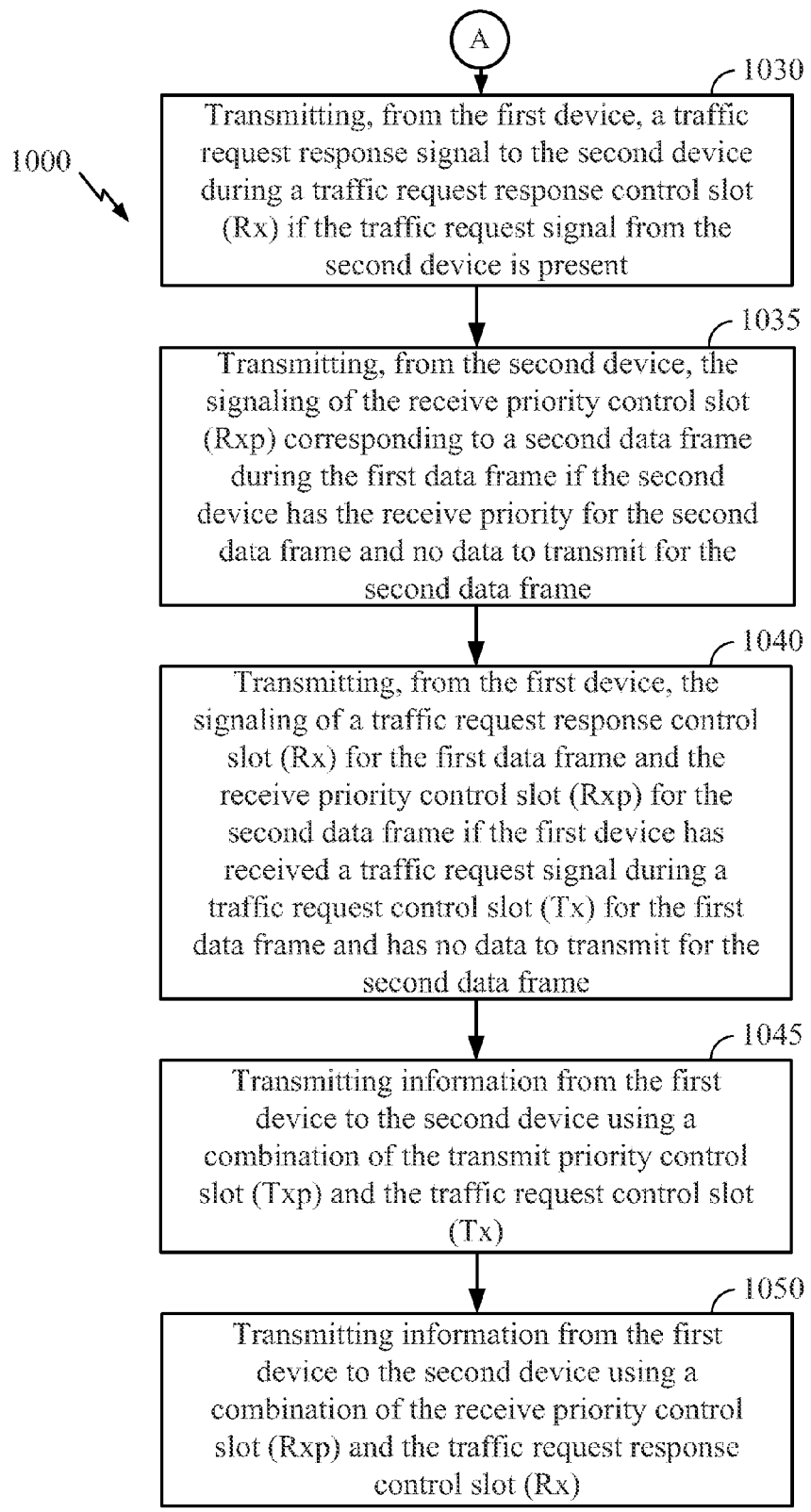

FIGS. 5-7 show exemplary time slots for transmitting and receiving by the nodes 101 and 102 in accordance with various embodiments. FIG. 8 is a flow diagram illustrating a method 800 of resolving transmission priority from the perspective of node A in accordance with various embodiments. FIG. 9 is a flow diagram illustrating a method 900 of resolving transmission priority from the perspective of node B in accordance with various embodiments. FIGS. 10A and 10B are flow diagrams illustrating a method 1000 of initiating a traffic transmission between a first device and a second device in accordance with various embodiments.

Referring to FIGS. 5-9, 10A and 10B, each node may have a wireless resource that is available for each link so that each node may light up (e.g., puts energy on or a signal on) the assigned resource indicating that the node is contending for a particular data slot (e.g., n or n+1) on that link. Generally, connection scheduling involves three slots: a transmit priority control slot (Txp), a traffic request control slot (Tx), and a traffic request response control slot (Rx). The Txp is a slot used to determine whether node A or node B has transmission priority over the particular data slot. For example, node A determines whether it has a transmission priority over node B during a first data slot (e.g., Txp).

As an example, suppose transmitter Tk (one of the transmitters T1-Tn) is contending for the particular data slot, transmitter Tk will light up the Txp resource when it has the transmit priority. Each transmitter can light up its own resource indicating that it is contending for the particular data slot. Which node has the priority for the particular data slot is determined a priori. In one embodiment, only the transmitters can transfer phase information to the receivers.

Suppose two links (A to B is link 1 and C to D is link 2) both want to transmit in the next data slot. If node A does not have any data to transmit, node A will not transmit in Txp but node B may transmit to node A in Tx. Node C may have transmit priority and data to transmit so node C will be transmitting to node D in Txp and Tx. Therefore, each link will have a different resource to transmit in.

To resolve the contention between the two nodes A and B of the link 103, a receive priority control slot (Rxp) is a slot used to determine whether node A or node B has receive priority over the particular data slot. For example, node B can light up the Rxp slot of n indicating that it wishes to be the receiver of data in the nth slot. If node B does not light up the Rxp slot, then node B wishes to be the transmitter of data in the nth slot. The Rxp alternates (deterministically or in a random manner) between the two ends of the link as a function of time. In one embodiment, Rxp for data slot (n+1) is transmitted along with the signaling for or adjacent to data slot (n) as shown in FIG. 5. Rxp provides an additional resource to allow faster and more efficient channel communications between node A and node B. Therefore, each link has a resource in Txp and a similar resource in Rxp and Rx.

In one embodiment, Txp and Rxp can alternate on adjacent data slots as shown in FIG. 7. For example, Txp can be used for data slot (n) and Rxp can be used for data slot (n+1). In another embodiment, Rxp can be moved from data slot (n+1) into a previous data slot (n) as shown in FIGS. 5 and 6. If the receivers of slot (n) have the receive priority for the next slot (n+1), then the combination of the Rx and Rxp slots can include any additional information it would like to share with all the receivers in those slots, for example, to help improve the channel communications.

FIG. 8 assumes that node A has the transmit priority for data slot (n) and the other end of the link has receive priority (e.g., node B). Node A (e.g., its processor 205) determines whether it has data to transmit to node B for data slot (n) (block 805). If node A does not have any data to transmit to node B for data slot (n), then the direction of traffic for data slot (n) is configured to be from node B to node A (block 810). Node A may then listen for a traffic request signal from node B during the Tx slot.

If node A has data to transmit to node B for data slot (n), then node A lights up Txp(n) and Tx(n) indicating that node A is contending for data slot (n) (block 815). At block 820, node A is configured to send the data to node B during data slot (n).

Node A listens to Rxp(n+1) and determines whether node B has lit up Rxp(n+1) (blocks 825 and 830). If node B has not lit up Rxp(n+1), then node B does not want to be a receiver but instead wants to be a transmitter and transmit data. In this situation, the direction of traffic for data slot (n+1) is configured to be from node B to node A (block 845).

If node B has lit up Rxp(n+1), then node B wants to be a receiver. If node B wants to be a receiver, then node A determines whether it has data to send to node B for data slot (n+1) (block 835). If node A has data to send to node B, then the direction of traffic for data slot (n+1) is configured to be from node A to node B (block 850). If node A does not have any data to send to node B, then a null data slot is produced (block 840).

FIG. 9 assumes that node B has the receive priority for data slot (n+1) and the other end of the link has transmit priority (e.g., node A). Node B (e.g., its processor 205) determines whether it has data to transmit to node A for data slot (n+1) (block 905). If node B has data to transmit to node A for data slot (n+1), then node B does not lights up or does not send a Rxp signal to node A (block 910). In this situation, node B has data to send to node A and therefore wants to be a transmitter. If node B has data, then the direction of traffic for data slot (n+1) is configured to be from node B to node A (block 915).

If node B does not have any data to transmit to node A for data slot (n+1), then node B lights up or sends a Rxp signal to node A indicating that it is ready to be a receiver (block 920). Thereafter, node B listens to the Tx data slot and determines whether there is data or a signal from node A (block 930). If there is no data or signal, then a null data slot is produced (block 945). If there is data or a signal, then the direction of traffic for data slot (n+1) is configured to be from node A to node B (block 935). Node A then sends the data to node B in the corresponding data slots (block 940).

FIGS. 10A and 10B are flow diagrams illustrating a method 1000 of initiating a traffic transmission between a first device 101 and a second device 102 in accordance with various embodiments. The method includes determining whether the first device has a receive priority or a transmit priority over the second device during a first data frame (block 1005), determining whether the first device has data to transmit to the second device during the first data frame (block 1010), transmitting, from the first device, a receive priority control signal during a receive priority control slot (Rxp) corresponding to the first data frame if the first device has the receive priority and no data to transmit (block 1015), and transmitting, from the first device, a transmit priority control signal during a transmit priority control slot (Txp) corresponding to the first data frame if the first device has the transmit priority and data to transmit (block 1020).

The method may also include transmitting, from the first device, a traffic request signal during a traffic request control slot (Tx) if the first device has data to transmit and has permission from the second device to transmit or if the first device has the transmit priority and data to transmit (block 1025), and transmitting, from the first device, a traffic request response signal to the second device during a traffic request response control slot (Rx) if the traffic request signal from the second device is present (block 1030).

In one embodiment, the method includes transmitting, from the second device, the signaling of the receive priority control slot (Rxp) corresponding to a second data frame during the first data frame if the second device has the receive priority for the second data frame and no data to transmit for the second data frame (block 1035), and/or transmitting, from the first device, the signaling of a traffic request response control slot (Rx) for the first data frame and the receive priority control slot (Rxp) for the second data frame if the first device has received a traffic request signal during a traffic request control slot (Tx) for the first data frame and has no data to transmit for the second data frame (block 1040).

In one embodiment, the method includes transmitting information from the first device to the second device using a combination of the transmit priority control slot (Txp) and the traffic request control slot (Tx) (block 1045). The information may be transmitted using a phase difference between the transmit priority control slot (Txp) and the traffic request control slot (Tx). The information may be quality of service (QoS) information.

In one embodiment, the method includes transmitting information from the first device to the second device using a combination of the receive priority control slot (Rxp) and the traffic request response control slot (Rx) (block 1050). The information may be transmitted using a phase difference between the receive priority control slot (Rxp) and the traffic request response control slot (Rx). The information may be quality of service (QoS) information.

Figure 11A:
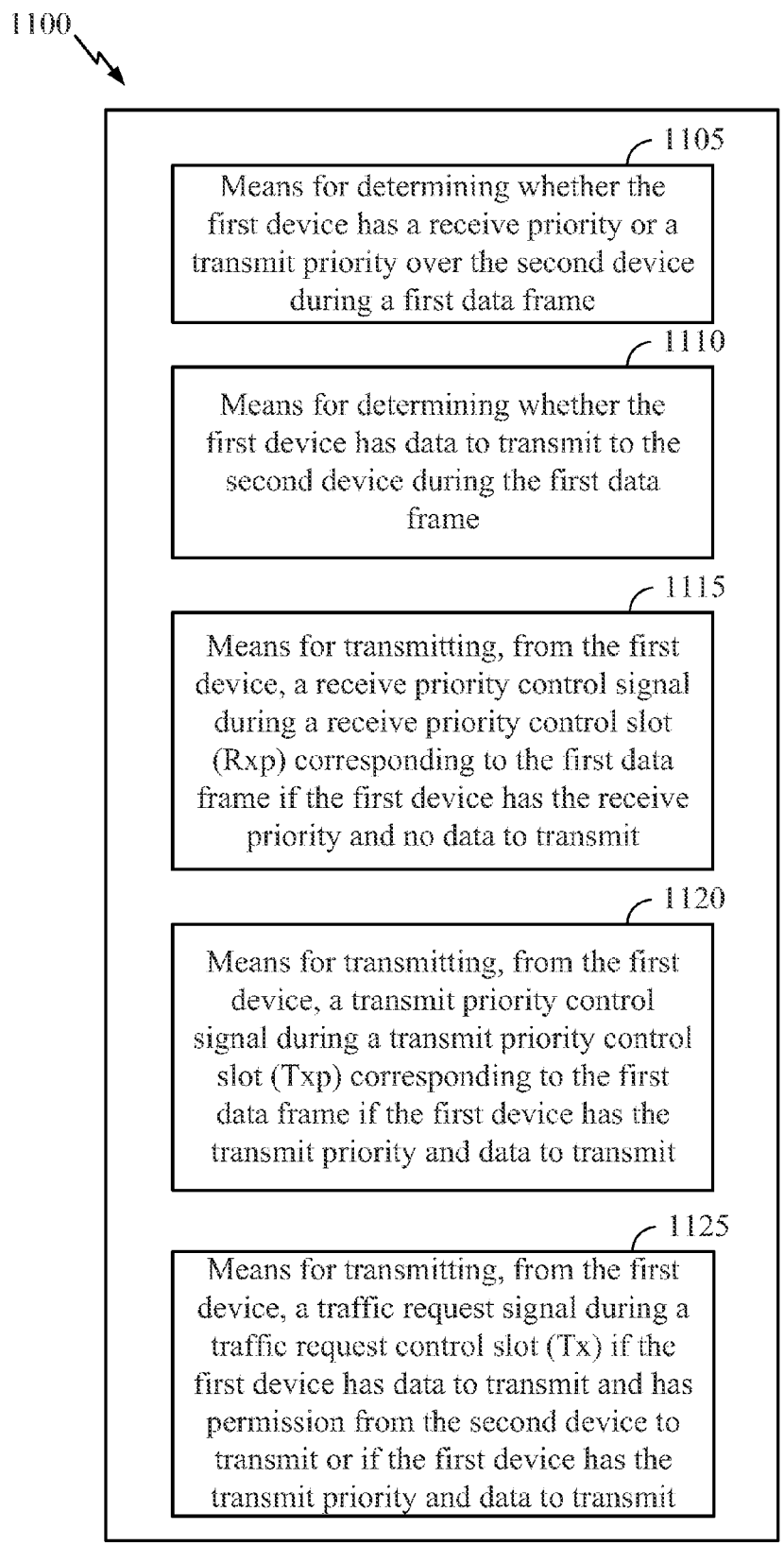
FIGS. 11A and 11B are block diagrams illustrating exemplary components for the apparatus and the means for apparatus for initiating a traffic transmission between a first device and a second device in accordance with various embodiments.
Figure 11B:
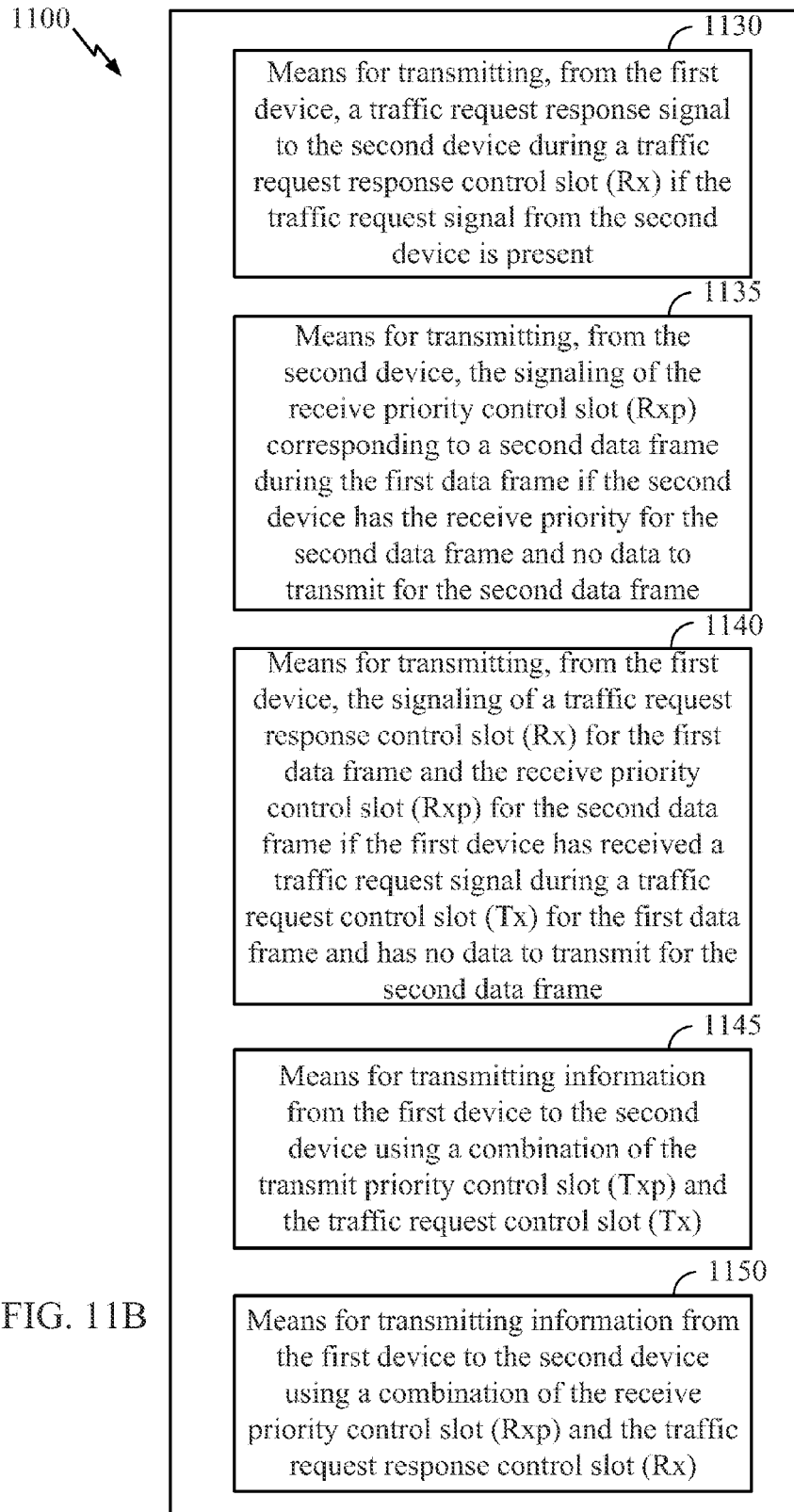

FIGS. 11A and 11B are block diagrams illustrating exemplary components for the apparatus 1100 and the means for apparatus 1100 for initiating a traffic transmission between a first device 101 and a second device 102 in accordance with various embodiments. The apparatus 1100 may include a module 1105 for determining whether the first device 101 has a receive priority or a transmit priority over the second device 102 during a first data frame, a module 1110 for determining whether the first device 101 has data to transmit to the second device 102 during the first data frame, a module 1115 for transmitting, from the first device 101, a receive priority control signal during a receive priority control slot (Rxp) corresponding to the first data frame if the first device 101 has the receive priority and no data to transmit, and a module 1120 for transmitting, from the first device 101, a transmit priority control signal during a transmit priority control slot (Txp) corresponding to the first data frame if the first device 101 has the transmit priority and data to transmit. The apparatus 1100 may also include a module 1125 for transmitting, from the first device 101, a traffic request signal during a traffic request control slot (Tx) if the first device 101 has data to transmit and has permission from the second device 102 to transmit or if the first device 101 has the transmit priority and data to transmit.

The apparatus 1100 may also include a module 1130 for transmitting, from the first device 101, a traffic request response signal to the second device 102 during a traffic request response control slot (Rx) if the traffic request signal from the second device 102 is present. The apparatus 1100 may also include a module 1135 for transmitting, from the second device 102, the signaling of the receive priority control slot (Rxp) corresponding to a second data frame during the first data frame if the second device 102 has the receive priority for the second data frame and no data to transmit for the second data frame, and/or a module 1140 for transmitting, from the first device 101, the signaling of a traffic request response control slot (Rx) for the first data frame and the receive priority control slot (Rxp) for the second data frame if the first device 101 has received a traffic request signal during a traffic request control slot (Tx) for the first data frame and has no data to transmit for the second data frame.

The apparatus 1100 may also include a module 1145 for transmitting information from the first device 101 to the second device 102 using a combination of the transmit priority control slot (Txp) and the traffic request control slot (Tx). The information may be transmitted using a phase difference between the transmit priority control slot (Txp) and the traffic request control slot (Tx). The information may be quality of service (QoS) information.

The apparatus 1100 may also include a module 1150 for transmitting information from the first device 101 to the second device 102 using a combination of the receive priority control slot (Rxp) and the traffic request response control slot (Rx). The information may be transmitted using a phase difference between the receive priority control slot (Rxp) and the traffic request response control slot (Rx). The information may be quality of service (QoS) information.

Those skilled in the art will appreciate that the various illustrative logical blocks, modules, circuits, and algorithms described in connection with the embodiments disclosed herein may be implemented as electronic hardware, computer software, or combinations of both. To illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processing device, a digital signal processing device (DSP), an application specific integrated circuit (ASIC), a field programmable gate array (FPGA) or other programmable logic device, discrete gate or transistor logic, discrete hardware components, or any combination thereof designed to perform the functions described herein. A general purpose processing device may be a microprocessing device, but in the alternative, the processing device may be any conventional processing device, processing device, microprocessing device, or state machine. A processing device may also be implemented as a combination of computing devices, e.g., a combination of a DSP and a microprocessing device, a plurality of microprocessing devices, one or more microprocessing devices in conjunction with a DSP core or any other such configuration.

The apparatus, methods or algorithms described in connection with the embodiments disclosed herein may be embodied directly in hardware, software, or combination thereof. In software the methods or algorithms may be embodied in one or more instructions that may be executed by a processing device. The instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processing device such the processing device can read information from, and write information to, the storage medium. In the alternative, the storage medium may be integral to the processing device. The processing device and the storage medium may reside in an ASIC. The ASIC may reside in a user terminal. In the alternative, the processing device and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of initiating a traffic transmission between a first device and a second device, the method comprising:
   determining whether the first device has a receive priority or a transmit priority over the second device during a first data frame;
   determining whether the first device has data to transmit to the second device during the first data frame;
   transmitting, from the first device, a receive priority control signal during a receive priority control slot (Rxp) corresponding to the first data frame if the first device has the receive priority and no data to transmit; and
   transmitting, from the first device, a transmit priority control signal during a transmit priority control slot (Txp) corresponding to the first data frame if the first device has the transmit priority and data to transmit.

2. The method of claim 1 further comprising transmitting, from the first device, a traffic request signal during a traffic request control slot (Tx) if the first device has data to transmit and has permission from the second device to transmit or if the first device has the transmit priority and data to transmit.

3. The method of claim 2 further comprising transmitting, from the first device, a traffic request response signal to the second device during a traffic request response control slot (Rx) if the traffic request signal from the second device is present.

4. The method of claim 1 further comprising transmitting, from the second device, the signaling of the receive priority control slot (Rxp) corresponding to a second data frame during the first data frame if the second device has the receive priority for the second data frame and no data to transmit for the second data frame.

5. The method of claim 1 further comprising transmitting, from the first device, the signaling of a traffic request response control slot (Rx) for the first data frame and the receive priority control slot (Rxp) for the second data frame if the first device has received a traffic request signal during a traffic request control slot (Tx) for the first data frame and has no data to transmit for the second data frame.

6. The method of claim 2 further comprising transmitting information from the first device to the second device using a combination of the transmit priority control slot (Txp) and the traffic request control slot (Tx).

7. The method of claim 6 wherein the information is transmitted using a phase difference between the transmit priority control slot (Txp) and the traffic request control slot (Tx).

8. The method of claim 6 wherein the information is quality of service (QoS) information.

9. The method of claim 3 further comprising transmitting information from the first device to the second device using a combination of the receive priority control slot (Rxp) and the traffic request response control slot (Rx).

10. The method of claim 9 wherein the information is transmitted using a phase difference between the receive priority control slot (Rxp) and the traffic request response control slot (Rx).

11. The method of claim 9 wherein the information is quality of service (QoS) information.

12. A first device for initiating a traffic transmission with a second device, the first device comprising:
a processor configured to:
determine whether the first device has a receive priority or a transmit priority over the second device during a first data frame;
determine whether the first device has data to transmit to the second device during the first data frame;
transmit, from the first device, a receive priority control signal during a receive priority control slot (Rxp) corresponding to the first data frame if the first device has the receive priority and no data to transmit; and
transmit, from the first device, a transmit priority control signal during a transmit priority control slot (Txp) corresponding to the first data frame if the first device has the transmit priority and data to transmit; and
a memory coupled to the processor.

13. The first device of claim 12 wherein the processor is further configured to transmit, from the first device, a traffic request signal during a traffic request control slot (Tx) if the first device has data to transmit and has permission from the second device to transmit or if the first device has priority and data to transmit.

14. The first device of claim 13 wherein the processor is further configured to transmit, from the first device, a traffic request response signal to the second device during a traffic request response control slot (Rx) if the traffic request signal from the second device is present.

15. The first device of claim 12 wherein the processor is further configured to transmit, from the second device, the signaling of the receive priority control slot (Rxp) corresponding to a second data frame during the first data frame if the second device has the receive priority for the second data frame and no data to transmit for the second data frame.

16. The first device of claim 12 wherein the processor is further configured to transmit, from the first device, the signaling of a traffic request response control slot (Rx) for the first data frame and the receive priority control slot (Rxp) for the second data frame if the first device has received a traffic request signal during a traffic request control slot (Tx) for the first data frame and has no data to transmit for the second data frame.

17. The first device of claim 13 wherein the processor is further configured to transmit information from the first device to the second device using a combination of the transmit priority control slot (Txp) and the traffic request control slot (Tx).

18. The first device of claim 17 wherein the information is transmitted using a phase difference between the transmit priority control slot (Txp) and the traffic request control slot (Tx).

19. The first device of claim 17 wherein the information is quality of service (QoS) information.

20. The first device of claim 14 wherein the processor is further configured to transmit information from the first device to the second device using a combination of the receive priority control slot (Rxp) and the traffic request response control slot (Rx).

21. The first device of claim 20 wherein the information is transmitted using a phase difference between the receive priority control slot (Rxp) and the traffic request response control slot (Rx).

22. The first device of claim 20 wherein the information is quality of service (QoS) information.

23. A first device for initiating a traffic transmission with a second device, the first device comprising:
means for determining whether the first device has a receive priority or a transmit priority over the second device during a first data frame;
means for determining whether the first device has data to transmit to the second device during the first data frame;
means for transmitting, from the first device, a receive priority control signal during a receive priority control slot (Rxp) corresponding to the first data frame if the first device has the receive priority and no data to transmit; and
means for transmitting, from the first device, a transmit priority control signal during a transmit priority control slot (Txp) corresponding to the first data frame if the first device has the transmit priority and data to transmit.

24. The first device of claim 23 further comprising means for transmitting, from the first device, a traffic request signal during a traffic request control slot (Tx) if the first device has data to transmit and has permission from the second device to transmit or if the first device has priority and data to transmit.

25. The first device of claim 24 further comprising means for transmitting, from the first device, a traffic request response signal to the second device during a traffic request response control slot (Rx) if the traffic request signal from the second device is present.

26. The first device of claim 23 further comprising means for transmitting, from the second device, the signaling of the receive priority control slot (Rxp) corresponding to a second data frame during the first data frame if the second device has the receive priority for the second data frame and no data to transmit for the second data frame.

27. The first device of claim 23 further comprising means for transmitting, from the first device, the signaling of a traffic request response control slot (Rx) for the first data frame and the receive priority control slot (Rxp) for the second data frame if the first device has received a traffic request signal during a traffic request control slot (Tx) for the first data frame and has no data to transmit for the second data frame.

28. The first device of claim 23 further comprising means for transmitting information from the first device to the second device using a combination of the transmit priority control slot (Txp) and the traffic request control slot (Tx).

29. The first device of claim 28 wherein the information is transmitted using a phase difference between the transmit priority control slot (Txp) and the traffic request control slot (Tx).

30. The first device of claim 28 wherein the information is quality of service (QoS) information.

31. The first device of claim 25 further comprising means for transmitting information from the first device to the second device using a combination of the receive priority control slot (Rxp) and the traffic request response control slot (Rx).

32. The first device of claim 31 wherein the information is transmitted using a phase difference between the receive priority control slot (Rxp) and the traffic request response control slot (Rx).

33. The first device of claim 31 wherein the information is quality of service (QoS) information.

34. A non-transitory machine readable medium embodying machine executable instructions to implement a method of initiating a traffic transmission between a first device and a second device, the method comprising:
   determining whether the first device has a receive priority or a transmit priority over the second device during a first data frame;
   determining whether the first device has data to transmit to the second device during the first data frame;
   transmitting, from the first device, a receive priority control signal during a receive priority control slot (Rxp) corresponding to the first data frame if the first device has the receive priority and no data to transmit; and
   transmitting, from the first device, a transmit priority control signal during a transmit priority control slot (Txp) corresponding to the first data frame if the first device has the transmit priority and data to transmit.

35. The method of claim 34 further comprising transmitting, from the first device, a traffic request signal during a traffic request control slot (Tx) if the first device has data to transmit and has permission from the second device to transmit or if the first device has priority and data to transmit.

36. The method of claim 35 further comprising transmitting, from the first device, a traffic request response signal to the second device during a traffic request response control slot (Rx) if the traffic request signal from the second device is present.

37. The method of claim 34 further comprising transmitting, from the second device, the signaling of the receive priority control slot (Rxp) corresponding to a second data frame during the first data frame if the second device has the receive priority for the second data frame and no data to transmit for the second data frame.

38. The method of claim 34 further comprising transmitting, from the first device, the signaling of a traffic request response control slot (Rx) for the first data frame and the receive priority control slot (Rxp) for the second data frame if the first device has received a traffic request signal during a traffic request control slot (Tx) for the first data frame and has no data to transmit for the second data frame.

39. The method of claim 35 further comprising transmitting information from the first device to the second device using a combination of the transmit priority control slot (Txp) and the traffic request control slot (Tx).

40. The method of claim 39 wherein the information is transmitted using a phase difference between the transmit priority control slot (Txp) and the traffic request control slot (Tx).

41. The method of claim 39 wherein the information is quality of service (QoS) information.

42. The method of claim 34 further comprising transmitting information from the first device to the second device using a combination of the receive priority control slot (Rxp) and the traffic request response control slot (Rx).

43. The method of claim 42 wherein the information is transmitted using a phase difference between the receive priority control slot (Rxp) and the traffic request response control slot (Rx).

44. The method of claim 42 wherein the information is quality of service (QoS) information.

* * * * *